United States Patent
Ravikumar et al.

(10) Patent No.: US 7,836,099 B2
(45) Date of Patent: Nov. 16, 2010

(54) MAIL COMPRESSION SCHEME WITH INDIVIDUAL MESSAGE DECOMPRESSABILITY

(75) Inventors: Shanmugasundaram Ravikumar, Berkeley, CA (US); Anirban Dasgupta, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 543 days.

(21) Appl. No.: 11/831,828

(22) Filed: Jul. 31, 2007

(65) Prior Publication Data

US 2009/0037447 A1    Feb. 5, 2009

(51) Int. Cl.
    *G06F 17/30* (2006.01)
(52) U.S. Cl. .................................. 707/803; 707/999.101
(58) Field of Classification Search ............. 707/1, 707/6, 10, 100, 101, 102, 200, 803, 999.001, 707/999.003, 999.006, 999.101, 999.102
See application file for complete search history.

(56) References Cited

U.S. PATENT DOCUMENTS

| | | | | |
|---|---|---|---|---|
| 5,883,975 | A * | 3/1999 | Narita et al. | 382/232 |
| 6,411,227 | B1 * | 6/2002 | Fish | 341/65 |
| 7,444,347 | B1 * | 10/2008 | Alley et al. | 1/1 |
| 7,477,166 | B2 * | 1/2009 | McCanne et al. | 707/999.102 |
| 7,698,285 | B2 * | 4/2010 | Grosset et al. | 1/1 |

* cited by examiner

*Primary Examiner*—Marc R Filipczyk
(74) *Attorney, Agent, or Firm*—Stattler-Suh PC (57) ABSTRACT

Embodiments of the present inversion relate to a two-pass compression scheme that achieves compression performance on par with existing methods while admitting individual message decompression. These methods provide both storage savings and lower end-user latency. They preserve the advantages of standard text compression in exploiting short-range similarities in data, while introducing a second step to take advantage of long-range similarities often present in certain types of structured data, e.g. email archival files.

7 Claims, 6 Drawing Sheets

MAIL COMPRESSION SCHEME WITH INDIVIDUAL MESSAGE DECOMPRESSABILITY

RELATED APPLICATIONS

None

BACKGROUND OF THE INVENTION

1. Field of the Invention

The present invention relates to the field of data compression and more specifically to schemes for compression and decompression of archival mail files.

2. Art Background

Archival emails for a single user that are not frequently accessed (say, emails more than a year old) are often stored in a reverse chronological order in a single large file, where each email message has a message header and a message body. This type of archival file also typically has a table of contents in the beginning of the file for direct access to individual mail messages.

Standard archival techniques include compress such large mail files using standard compression algorithms such as bzip or lzma. Compression saves storage and does not adversely impact end user experience if the emails are rarely accessed. However, in case the user ever wants to access even a single email from this file, the entire file has to be decompressed in memory. This is computationally expensive and could result in high latency for the end user.

Furthermore, standard compression techniques in isolation tend not to take advantage of both long-range and short-range similarities in the data being compressed. In email archives, and some other types of structured data, we expect to see many long-range similarities; however, standard short-range compression techniques are still effective. Thus a compression scheme that employs both short- and long-range similarities is desirable.

Bentley and Mellroy. (Bentley, J. L., and Mellroy M. D. *Data compression using long common strings*. In Data Compression Conference (1999), pp. 287-295.) proposed one widely adopted method that effectively takes advantage of long-range similarities. However, the method of Bentley and Mellroy does not permit selective decompression, nor is it adapted for structured archival email files. The Karp-Rabin fingerprinting method discussed within Bentley and Mellroy and below can be found in standard texts such as Algorithms by Cormen, Leiserson, Rivest, and Stein.

SUMMARY OF THE DISCLOSURE

Embodiments of the present invention relate to a two-pass compression scheme that achieves compression performance on par with existing methods while admitting individual message decompression. These methods provide both storage savings and lower end-user latency. They preserve the advantages of standard text compression in exploiting short-range similarities in data, while introducing a second step to take advantage of long-range similarities often present in certain types of structured data, e.g. email archival files.

In one aspect, embodiments of the present invention relate to data structures stored in a computer-readable medium. For example, a data structure stored in disk, comprising a table of contents, a dictionary and n data blocks. Here n is some positive integer, preferably much greater than one. The table of contents includes n pairs of data block identifiers and offsets. The offset indicates the location of the data block identified by the data block identifier. The dictionary includes a series of entries. Each entry comprises a match string, and a plurality of match length, offset pairs. Each of the n data blocks comprises an information portion, and a compressed content portion. If partially decompressed, at least one location in a content portion, contains a pointer to a dictionary entry indicating that a substring of the match string having a length equal to the match length was removed from that location of the content portion.

In another aspect, embodiments of the present invention relate to computer-implemented methods. For example a method operating on an archival file that includes a table of contents and a series of data blocks, wherein each data block comprises an information portion and a content portion. One such method comprises forming, based on the content portions of the archival file, a dictionary data structure. The dictionary data structure comprises a series of entries, each, of which is a match string and a plurality of file offset, match length pairs describing a repeated substring of the archival tile and the locations and lengths at which it is repeated.

The method further comprises forming a compressed output file. The output file includes an updated table of contents, a copy of the dictionary data structure, and a series of compressed data blocks. Each compressed data block corresponds to a data block of the archival file and comprises the information portion and a compressed content portion, wherein the compressed content portion has had any repeated substrings corresponding to dictionary entries replaced by pointers to those dictionary entries corresponding and then been further compressed via a standard text compression algorithm.

In some embodiments, forming a compressed output file comprises the following steps: writing an intermediate table of contents to the output file, writing an information portion of a first data block to the output file; updating file offset of the table of contents entry corresponding to the first data block; reading the content portion of the first data block to an input stream while checking the file offset of each character read against the dictionary data structure. The method also includes, in the event of a matching file offset, inserting into the input stream a token pointing to the dictionary entry containing the matching file offset and skipping a substring of the match length in the content portion. The method further includes a step of compressing the input stream via a standard short-range compression algorithm to form a compressed content portion, and a step of writing the compressed content, portion to the output file. Preferably the table of contents comprises a series of data block identifier and blank file offset pairs.

Preferably either of the above aspects is implemented in an email server to store or operate on archival email files. In this case the information portions are email headers and the content portions are email bodies, further, the email server is preferably configured to selectively decompress an email body of a data block given its data block identifier. The email server uses a given data block identifier to look up the corresponding data block in the table of contents, partially decompresses the email body, then uses the pointers and the dictionary to fully decompress the email body. In some embodiments an email server performs selective decompression of a given data block based on a request from an email client.

DETAILED DESCRIPTION

This disclosure sets forth a computer-implemented method operating on an archival file, as well as associated data structures. The method disclosed and described below is a multi-step compression algorithm that takes advantage of both short-range and long-range similarities in the compressed data.

Data

The preferred embodiments of the present invention operate on archival mail files. However, various embodiments of the invention are suitable for operating on other structured data files. The InputFile, shown in FIG. 1, exhibits the general characteristics desirable for a file operated on in a method consistent with some embodiments of the present invention. Though the present invention is described as operating on a single file, some embodiments that operate on multiple files are consistent with the present invention.

InputFile

As mentioned above, the InputFile of FIG. 1 exhibits the general characteristics desirable in a file used by embodiments of the present invention. The beginning of the InputFile is stable of contents, TOC that lists a series of n data block identifiers and the file offset location of each data block. Following the TOC is a series of n data blocks. Each data block includes an information portion, e.g. Info-1, and a content portion, e.g. Content-1. In a preferred file, the information portion contains parameters descriptive of the content portion, for example its size, whether it's compressed or not, and other information such as its author, publisher, etc.

Figure 1:
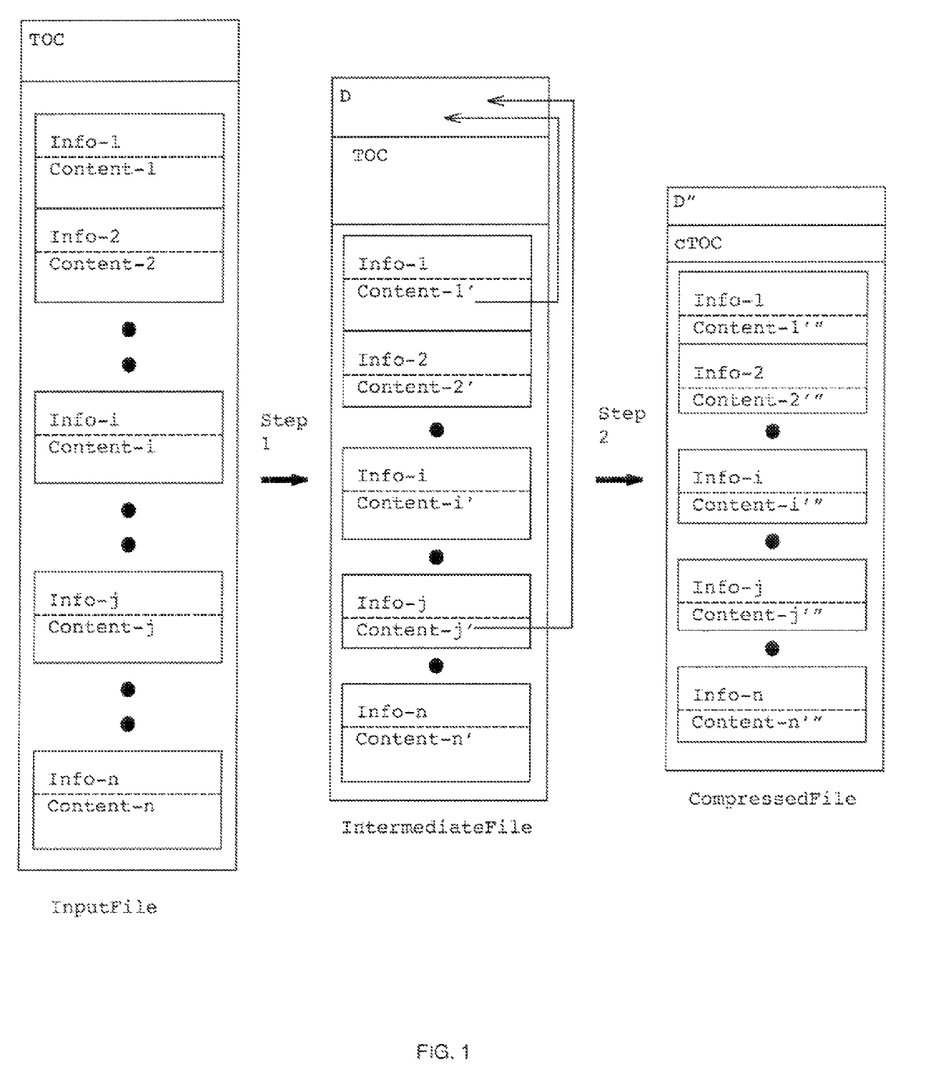
FIG. 1 shows a series of data structures stored in a computer readable medium consistent with some embodiments of the present invention.

In the preferred embodiment the InputFile is an email archival file. In this case, each information portion is a message header and each content portion is a message body. The message header contains information about the mail-paths, whether the message body is compressed or not, and also contains the size of the message body.

Compression Order

In general methods consistent with the present invention employ a dictionary formed during a pre-processing routine of the algorithm in order to perform part of the compression. The other part of the compression uses standard text compression algorithms. Thus, conceptually at least, methods consistent with embodiments of the present invention provide a two-step compression scheme: a first step replaces oft-repeated strings with pointers to a dictionary, and a second step compresses the file.

In the preferred embodiment the data blocks are each fully compressed in sequence. For example, the first block is taken through both steps of compression, then the second block is taken through both steps, then the third block, and so on. However, in some embodiments, compression takes place in steps over the entire file, i.e. each block is taken through a first step, then each block is taken through a second step.

FIG. 1 illustrates a partially compressed file, IntermediateFile, consistent with the later type of embodiment. Note however that though, this file is not formed in the preferred embodiment, each data block does progress through the intermediate state illustrated, but they do so at different times.

IntermediateFile

The IntermediateFile file shown in FIG. 1 is the product of applying compression Step 1 to the InputFile. The IntermediateFile file includes the TOC and a series of data blocks. The data blocks each contain an information portion, e.g. Info-i, and a partially compressed content portion, e.g. Content-i'. The file further contains a dictionary D that includes entries listing repeated strings within the content portions of InputFile. The content of the dictionary, and the procedure for producing it, are discussed more fully below. In this file, the content portions have had any repeated strings listed in the dictionary D replaced with pointers to the dictionary. For example, the content portions Content-j' and Content-1' both include pointers to the dictionary as schematically illustrated in FIG. 1. The information portions and the TOC remain uncompressed after compression Step 1.

CompressedFile

Applying both compression steps Step 1 and Step 2 produces the output file CompressedFile. The structure of CompressedFile is consistent with both the case of block-wise application of both compression steps, or with file-wise application of first Step 1 and then Step 2, as illustrated. This is because once the steps are fully applied in either ease, the result is a file structurally equivalent to CompressedFile.

CompressedFile includes a corrected table of contents cTOC, a dictionary D'', and as series of data blocks, each having an information portion, e.g. Info-j, and a compressed content portion, e.g. Content-j'''. In FIG. 1, the dictionary D'' has preferably been compressed along with the content portions via step 2 compression.

The cTOC has been updated relative to the TOC to reflect the shortened file. It lists n data block identifiers and the updated file offsets of the data blocks containing compressed content portions.

In the preferred embodiment, where the data blocks are emails, the information portions email headers and the content portions email bodies, the TOC and cTOC preferably include message IDs as data block identifiers.

Method

The embodiments of the present invention relate to a two-pass method in which two types of compression are applied to a structured data file, e.g. InputFile of FIG. 1. In a first pass a pre-processing routine of the method is performed to form a dictionary that comprises entries listing the strings repeated in the content portions of the input file. In the second pass a dictionary-based compression, and a standard compression are sequentially applied to the content portion of each data block to output a compressed file.

In some embodiments, including the preferred embodiment described below, the method uses a Karp-Rabin fingerprint based method to construct a dictionary of the repeated strings of the input file. Other methods of finding repeated strings to construct the dictionary are consistent with the present invention.

Overview

Figure 2:
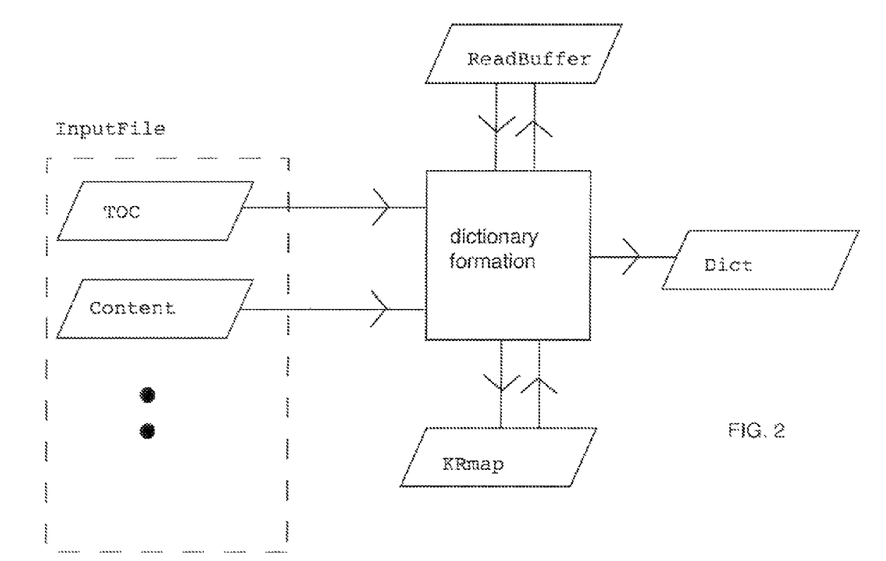
FIG. 2 shows a pre-processing routine of a computer-implemented compression algorithm consistent with some embodiments of the present invention.

Referring now to FIG. 2, the pre-processing routine in which dictionary formation occurs is shown. The preprocessing portion of the method employs two key data structures, which are maintained throughout operation. The first is called KRmap, which is a set of standard Karp-Rabin fingerprints and a position pointer in the file (i.e., the file offset). The second is ReadBuffer that stores the B characters/tokens that are being currently read; the parameter B can be arbitrarily chosen.

As shown in FIG. 2, the method reads Content from the InputFile and uses ReadBuffer and KRmap to form an in-memory dictionary data structure Dict. In the illustrated method, dictionary formation portion uses TOC data to find the content portions of the InputFile.

Figure 3:
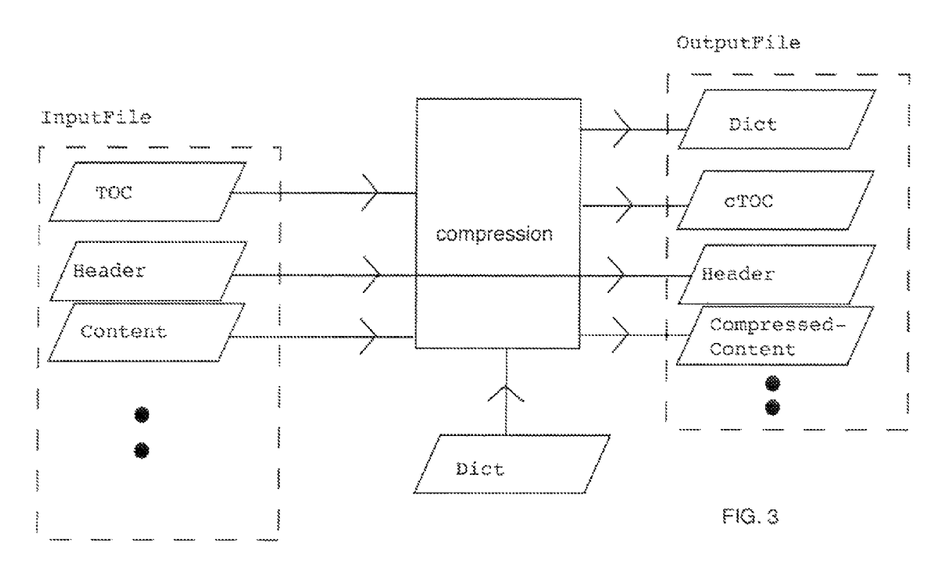
FIG. 3 shows a compression routine of a computer-implemented compression algorithm consistent with some embodiments of the present invention.

Referring now to FIG. 3, the compression routine of the method is shown. The compression routine also operates on the InputFile, using TOC, headers, and Content. The compression routine further employs the dictionary Dict.

The compression routine writes Dict and TOC to the OutputFile, optionally compressing Dict. Then, the compression routine writes header verbatim to the output file, and at this point updates the TOC to cTOC to reflect the file offset of a data block in the compressed file.

The compression routine then processes the content portions, replacing repeated strings with Dict entries with pointers to those Dict entries, and then applying a standard compression to produce CompressedContent.

Each data block is sequentially compressed via these steps, with the cTOC being updated each time a new header is written. Note that Dict can be written to the file later and need not be written contiguously with cTOC.

Figure 4:
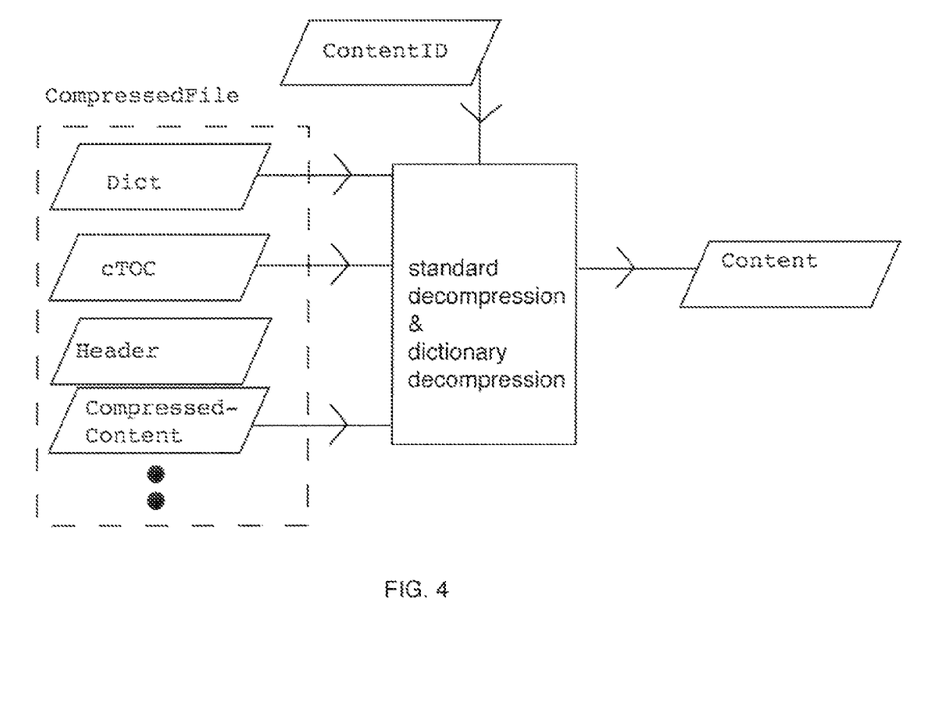
FIG. 4 shows a decompression routine of a computer-implemented compression algorithm consistent with some embodiments of the present invention.

Referring now to FIG. 4, a decompression routine consistent with some embodiments of the present invention is shown. The decompression routine includes standard decompression, which reverses the standard compression applied in the compression routine, and dictionary decompression, which substitutes pointers to the dictionary of repeated strings with the appropriate repeated string.

As shown, the decompression routine receives ContentID from an outside source. For example, in an email system, an email client request supplies a message ID to a decompression routine for a message that, needs to be retrieved from a compressed archival file.

The decompression routine uses the ContentID and cTOC in the CompressedFile to find the appropriate CompressedContent. The routine then employs standard decompression to produce a partially decompressed content portion, e.g. a content portion as shown in IntermediateFile of FIG. 1. This partially decompressed content portion may contain a pointer to Dict, if so, the decompression routine inserts the appropriate string from Dict into the partially decompressed content portion to produce a content portion, Content. Thus, the output of the decompression routine is a fully decompressed content portion corresponding to the ContentID supplied to the routine.

Dictionary Formation

Figure 5:
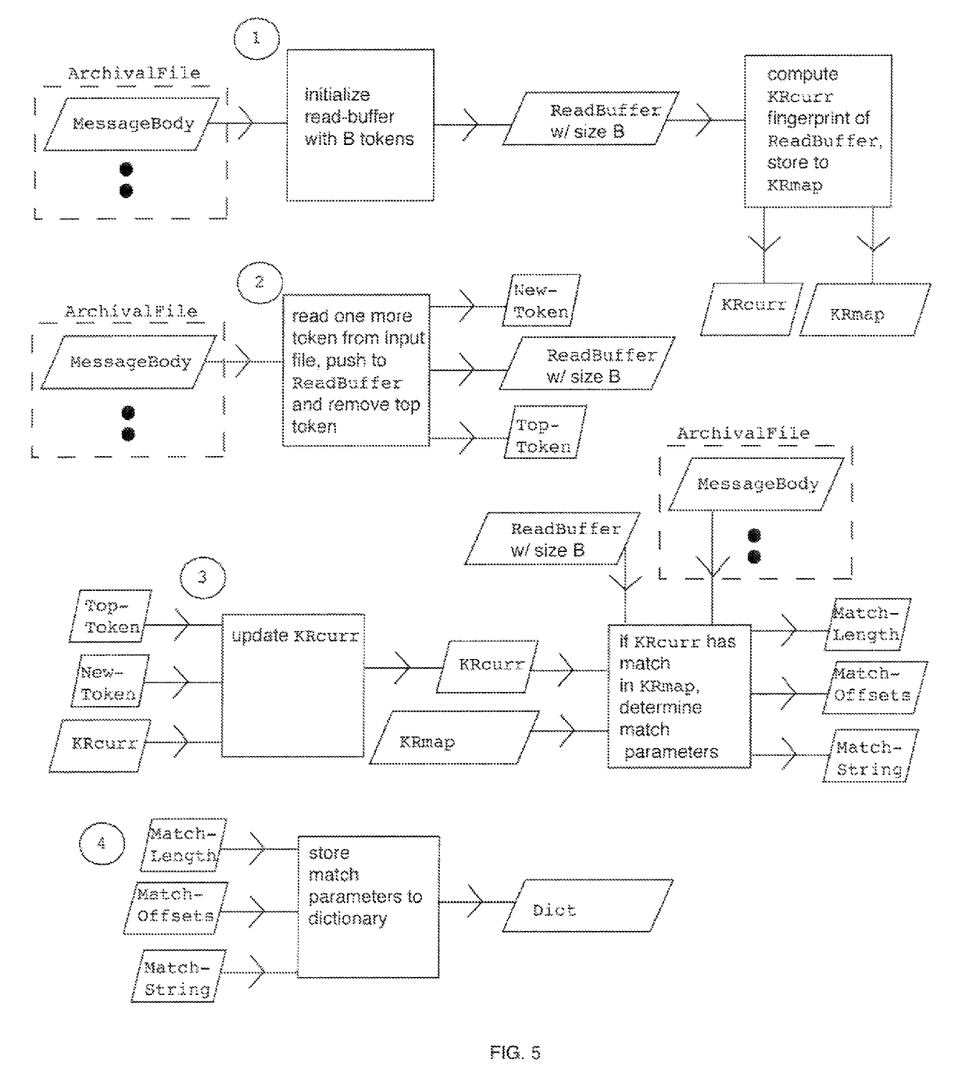
FIG. 5 illustrates several steps of a dictionary formation portion of a computer-implemented algorithm consistent with some embodiments of the present invention.

Referring now to FIG. 5 an embodiment of a preprocessing dictionary formation routine consistent with some embodiments of the present invention is shown. The routine includes steps 1 to 4. These steps take place in a single pass over the input, ArchivalFile.

During this pass, the method skips over the message headers and reads in the message bodies, MessageBody. In reading in the message bodies, the method first performs an initialization during step 1. The method initializes the ReadBuffer with B tokens from the MessageBody. Then, based on the current read buffer, the method computes KRcurr, the fingerprint of ReadBuffer and stores it, along with the current file offset, to KRmap, KRmap is a set of KR fingerprints and their associated file locations.

Then, in step 2, the method reads one more token from the input, pushes it to the ReadBuffer, and removes the top token the read buffer. This step updates ReadBuffer along with a record of the new token, NewToken, which was just added to ReadBuffer, and the top token, TopToken, which was just removed from ReadBuffer.

In step 3, the method uses KRcurr, the KR fingerprint of the previous ReadBuffer, along with TopToken and NewToken to produce an updated KR fingerprint of ReadBuffer. This update is performed via the standard subtract-multiply-add operation of Karp & Rabin. The updated KR fingerprint is stored to KRcurr, which is then compared with the entries of KRmap.

If a match is found in KRmap, the method compares a string starting at the current file offset with the string starting at the matched file offset from KRmap. The method continues the match for as long as possible. If the match length exceeds the ReadBuffer size, both file pointers are moved forward and the comparison continues. This comparison operation either returns immediately with no match or returns with the MatchLength. The Matchoffsets, matched offset and current offset at which the match began, MatchLength, and MatchString, the matching repeated string, are produced by step 3.

In step 4, MatchOffsets, MatchLength, and MatchString are stored to the dictionary Dict. Preferably, this data is stored in a single dictionary entry, which includes the match string and the pairs matched offset, match length, and current offset, match length.

Following step 4, the method refills the ReadBuffer and continues as before. Preferably, if the current file pointer is zero modulus some large number N, then the method stores the fingerprint of the read buffer in KRmap. Also note that prefixes of the strings stored in the Dict can be matched and stored again later in the input file with different match length. Thus, at the end of the preprocessing routine, the Dict contains the frequently occurring strings along with the position and length where they occur. Note that the length of the ReadBuffer, and thus of the KR fingerprint of interest, determines the minimum string size for which a match is considered by the method.

Compression

Figure 6:
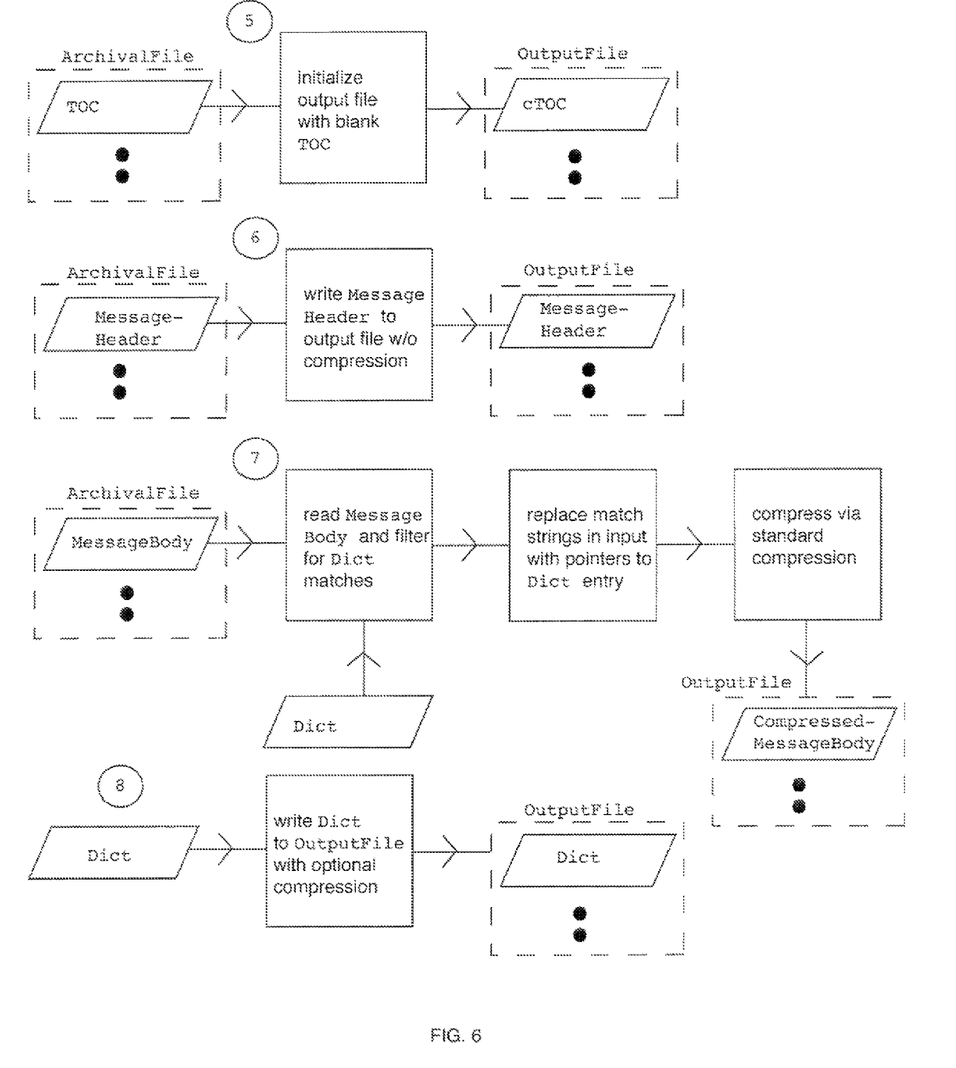
FIG. 6 illustrates several steps of a compression routine of a computer-implemented algorithm consistent with some embodiments of the present invention.

Referring now to FIG. 6 an embodiment of a compression routine consistent with some embodiments of the present invention is shown. The routine includes steps 5 to 8, indicating that it is performed contiguous with and following the pre-processing routine of FIG. 5. These steps take place in a single pass over the input, ArchivalFile, thus the method consisting of the preprocessing and the compression routine takes place in two passes over the input.

In the first step of the compression routine, step 5, the TOC is read from the input ArchivalFile and written as cTOC to the OutputFile. The message ID values of the cTOC are valid at this point, but the file offset values are considered invalid.

In the second step, step 6, MessageHeader is written verbatim to the OutputFile, no compression is applied. In this step, the file offset entry of the corresponding message ID in the cTOC is updated.

In step 7 MessageBody is read in and its file locations compared with the offsets listed in the dictionary Dict for matches. If a match occurs, the string of MatchLength in the input is replaced with a pointer to the dictionary entry, or special token indicating such a pointer. Following replacement of all matched strings, MessageBody is compressed via standard compression and written to the output file as CompressedMessageBody. Steps 6 and 7 are repeated for each message header and body, with the cTOC being updated each time a header is written.

In step 8 the dictionary Dict is written to the OutputFile. Optionally and preferably the dictionary Dict is compressed when written to the OutputFile. Preferably the compression applied to the Dict is the same standard method applied to the message bodies. Preferred compression methods include gzip, bzip and lzma.

Decompression

Figure 7:
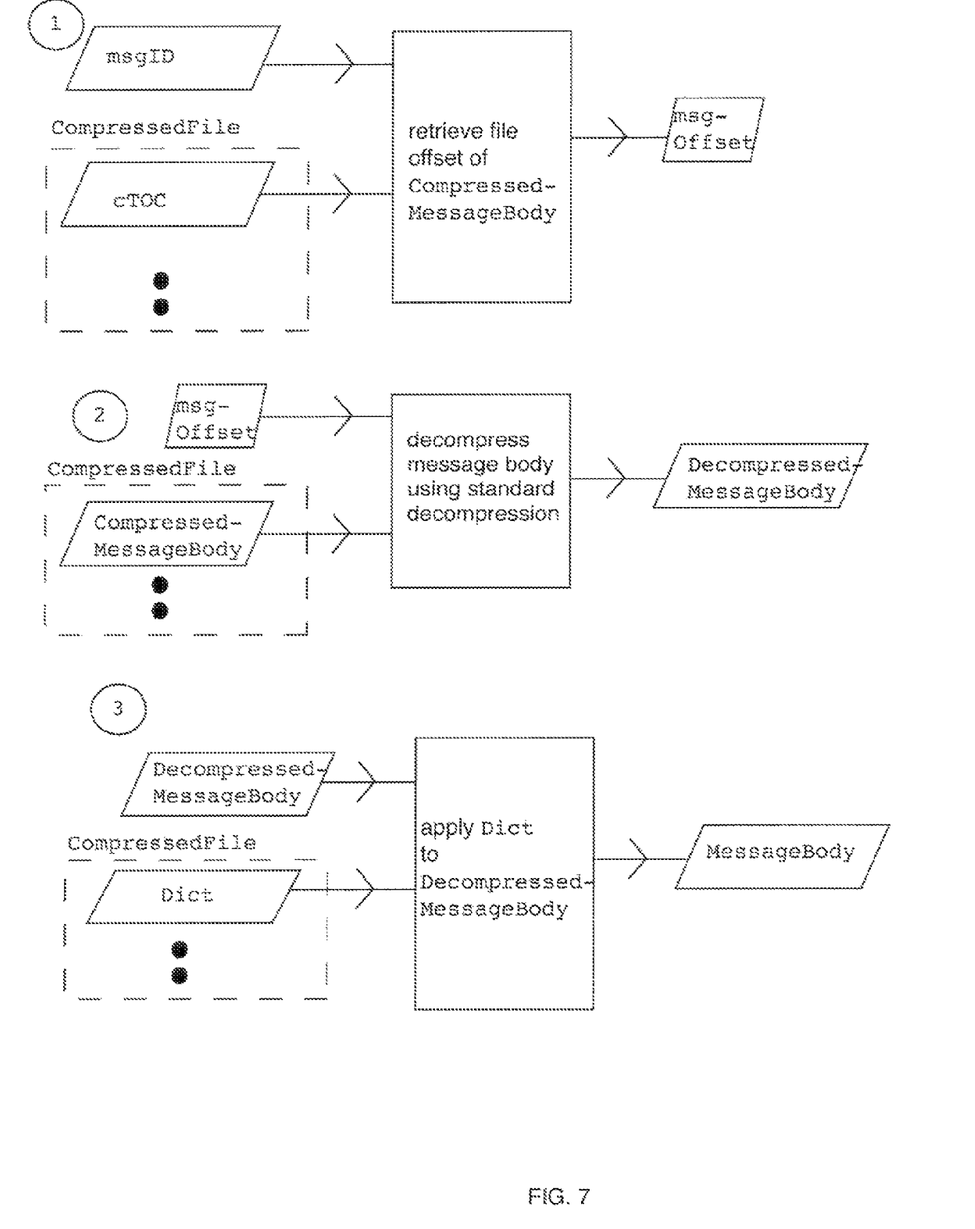
FIG. 7 illustrates several steps of a decompression routine of a computer-implemented algorithm consistent with some embodiments of the present invention.

FIG. 7 illustrates a decompression routine consistent with some embodiments of the present invention. The routine includes 3 steps. It receives a data block identifier, msgID, and operates on a CompressedFile to decompress and output a corresponding message body. The routine selectively decompresses messages without need to decompress the entire CompressedFile.

In step 1, the routine receives msgID and uses the cTOC in the compressed file to retrieve the file offset of CompressedMessageBody corresponding to msgID. This offset, msgOffset, is used in step 2.

Step 2 of the routine finds CompressedMessageBody by using msgOffset and decompresses CompressedMessageBody using standard decompression to produce DecompressedMessageBody. The standard decompression is the decompression technique complementary to the standard compression employed in the compression routine, e.g. gzip, bzip, lzma, etc.

In step 3, the dictionary Dict is used. If compressed, Dict must first be decompressed, again with the standard decompression technique complementary to the compression with which Dict was previously compressed. The dictionary Dict is applied to DecompressedMessageBody, a pointer to a dictionary entry is replaced with an appropriate length of that entry's match string, and the output is MessageBody, folly decompressed.

Advantages

Methods consistent with the embodiments of the present invention have numerous advantages over standard compression techniques when applied to data structures as set forth herein.

For example, when applied to email, the frequency of long range similarities in archived email due to replies, forwards, and other quotations yields many repeated strings and a good compression ratio from the dictionary-based portion of the methods set forth. Further the decompression routines consistent with the present invention permit savings due to selective decompression on archival email access.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A data structure stored in a computer-readable medium for archiving and retrieving one or more data blocks stored in a single file, comprising:
    a table of contents comprising n data block identifier and offset pairs, where n is a positive integer, wherein the offset indicates the location of the data block identified by the data block identifier;
    a dictionary, including a series of entries each comprising a match string, and a plurality of match length, offset pairs; and
    a file comprising n data blocks, each data block comprising an information portion and a compressed content portion, wherein the information portions comprise email headers and the content portions comprise email bodies, and wherein, if partially decompressed, at least one location in a content portion contains a pointer to a dictionary entry indicating that a substring of the match string having a length equal to the match length was removed from that location;
    wherein the data structure is further executed in at least one email server to store archival email files and to selectively decompress an email body of a data block given its data block identifier;
    wherein one of the n data blocks is identified by the table of contents and the compressed content portion is decompressed without decompressing other data blocks in the file by the email server using a given data block identifier to look up the corresponding data block in the table of contents, partially decompressing the email body, and using the pointers and dictionary to fully decompress the email body.

2. The data structure of claim 1, wherein the offsets comprise file offsets in the single file.

3. The data structure of claim 1, wherein the email server performs selective decompression of a given data block based on a request from an email client.

4. A computer-implemented method for storing and retrieving messages from a file comprising a plurality of messages, the method comprising:
    storing an archival file comprising:
        a table of contents comprising n data block identifier and offset pairs, where n is a positive integer, wherein the offset indicates the location of the data block identified by the data block identifier, wherein an email body of a data block can be selectively decompressed given its data block identifier;
        a dictionary, including a series of entries each comprising a match string, and a plurality of match length, offset pairs; and
        a file comprising n data blocks, each data block comprising an information portion and a compressed content portion wherein the information portions comprise email headers and the content portions comprise email bodies, and wherein, if partially decompressed, at least one location in a content portion contains a pointer to a dictionary entry indicating that a substring of the match string having a length equal to the match length was removed from that location;
    receiving a request, at one or more email servers, to retrieve a specified data block;
    identifying, in the email server, a location for the data block specified in the archival file using the table of contents;
    selectively decompressing, in the email server, an email body of a data block given its data block identifier; and
    decompressing, in the email server, the compressed content portion for the data block, wherein the compressed content portion is decompressed without decompressing other data blocks in the file by the email server using a given data block identifier to look up the corresponding data block in the table of contents, partially decompressing the email body, and using the pointers and dictionary to fully decompress the email body.

5. The computer-implemented method of claim 4, wherein forming the archival file comprises:

writing an intermediate table of contents to the archival file, wherein the table of contents comprises a series of data block identifier and blank file offset pairs;

writing an information portion of a first data block to the archival file;

updating file offset of the table of contents entry corresponding to the first data block;

compressing the input stream via a standard short-range compression algorithm to form a compressed content portion; and writing the compressed content portion to the archival file.

6. The computer-implemented method of claim 4, wherein forming the archival file comprises:

reading the content portion of a first data block to an input stream while checking the file offset of each character read against the dictionary; and inserting into the input stream, in the event of a matching file offset, a token pointing to the dictionary entry containing the matching file offset and skipping a substring of the match length in the content portion.

7. The computer-implemented method of claim 4, wherein the email server performs selective decompression of a given data block based on a request from an email client.

* * * * *